(12) United States Patent
Yan

(10) Patent No.: US 11,079,766 B2
(45) Date of Patent: Aug. 3, 2021

(54) COLLISION SENSING DEVICE FOR LASER MODULE

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 238 days.

(21) Appl. No.: 16/277,346

(22) Filed: Feb. 15, 2019

(65) Prior Publication Data

US 2020/0264624 A1      Aug. 20, 2020

(51) Int. Cl.
*G05D 1/02*      (2020.01)

(52) U.S. Cl.
CPC ........... *G05D 1/0227* (2013.01); *G05D 1/024* (2013.01); *G05D 2201/0203* (2013.01)

(58) Field of Classification Search
CPC ....... G05D 2201/02; G05D 2201/0203; G05D 2201/0214; G05D 2201/0215; G05D 2201/0216; G05D 1/00; G05D 1/02; G05D 1/0214; G05D 1/0227; G05D 1/0229; G05D 1/0231; G05D 1/0238; G05D 1/024; G05D 1/0257; G05D 1/0289; G05D 3/00; G05D 3/12; G05D 3/125

USPC ........................................................... 701/23
See application file for complete search history.

(56) References Cited

U.S. PATENT DOCUMENTS

2005/0021181 A1 *    1/2005  Kim ..................... G05D 1/0227
                                                                      700/245

* cited by examiner

*Primary Examiner* — Anthony R Jimenez
(74) *Attorney, Agent, or Firm* — Chun-Ming Shih; HDLS IPR Services

(57) ABSTRACT

A collision sensing device for laser module accommodates a laser module by a shield body, a moving seat and a base, and a scanning space is set between the shield body and the moving seat to provide a scanning environment for laser module. When a shield body is collided, the shield body may drive the moving seat to move backward, and a traction part disposed at a periphery of the moving seat drives one end of a linkage body to move backward. Therefore, when the linkage body moves backward, it touches or presses a sensing part of a sensing element, the sensing element may determine whether the shield body is collided; if it is determined that the cover shield body is collided, a collision information may be transmitted to a control unit to drive a robot to move out of trouble.

14 Claims, 9 Drawing Sheets

COLLISION SENSING DEVICE FOR LASER MODULE

BACKGROUND OF THE INVENTION

Field of the Invention

The present invention relates to a collision sensing device for laser module, in particular, to an anti-collision sensing device that senses that the shield body is collided via the movement of the moving seat.

Description of the Prior Art

Today's technology is changing with each passing day, and robots have been widely used in many different fields to assist or replace human beings in a variety of tasks. However, due to different needs, the types of robots used are also different, such as industrial robots or household robots.

Among them, in the household robots, a sweeping robot is one of the common robots, which is applied to the related fields of cleaning to help the human body complete the cleaning work by the automatic cleaning function of the sweeping robot.

However, the conventional sweeping robot has a sensor on the periphery of the robot to sense whether there is an obstacle in the path of the robot, so as to achieve the function of avoiding obstacles. In addition, usually for the robot to perform the environment scanning action, a laser module is additionally provided to protrude from the top surface of the robot, thereby performing related scanning work.

However, when the laser module protruding from the top surface of the robot hits an object, the robot won't effectively use the sensor provided in the periphery to sense, and then, the robot is stuck in place and may not move. Therefore, there is a need in the art for a device that may provide a protruding position for a laser module to sense whether an object is hit, so as to avoid the robot being stuck and unable to move. This is an urgent problem to be improved.

SUMMARY OF THE INVENTION

To solve above problem, the present invention aims at providing a collision sensing device for laser module, so that when a shield body is collided, the shield body may drive the moving seat to move in a direction, and a traction part disposed at a periphery of the moving seat drives one end of a linkage body to move in the direction. Therefore, when the linkage body moves in the direction, it touches or presses a sensing part of a sensing element, the sensing element may thereby determine whether the shield body is collided; if it is determined that the cover shield body is collided, a collision information may be transmitted to a control unit to drive a robot to move out of trouble.

To achieve above purpose, the present invention provides a collision sensing device for laser module comprising:

a base disposed at any position inside or outside the robot, one surface of the base being connected to a laser module and provided with at least one limiting element;

a moving seat provided with at least one moving part and one traction part at a periphery thereof, the moving part being in contact with the limiting element to limit the moving direction of the moving seat;

a linkage body connected to the traction part at one end, and connected to the inside of the robot at the other end;

a sensing element disposed inside the robot, and provided with a sensing part, the sensing part being disposed adjacent to one side of the linkage body;

a cover body disposed on one side of the robot, and provided with a moving space to provide the movement of the moving seat in the moving space, at least one blocking part being disposed at a position between the cover body and the base;

at least one elastic element sandwiched between the moving part and the blocking part, the elastic element being compressed by the moving part to have a resilient force when the moving part moves toward the position of the blocking part, the elastic element providing the moving part to move to an original position by the resilient force; and a shield body connected to the moving seat to accommodate the laser module in the shield body, the moving seat and the base.

Preferably, the moving end is provided with a fixing portion at one end thereof, and the fixing portion is engaged with the elastic element to limit the position of the elastic element.

Preferably, the moving part is provided with a limiting part at the other end, a spacing being set between the limiting part and the limiting element; when the moving part moves toward the position of the blocking part, the limiting part is adjacent to the limiting element, and when the limiting part is in contact with the limiting element, the moving part may no longer move toward the position of the blocking part due to the limitation of the limiting part.

Preferably, when the moving seat moves, the traction part drives the linkage body to move toward the position of the sensing element, and when the sensing part is touched or pressed by one side of the linkage body, the sensing element determines that the shield body is subjected to a collision.

Preferably, there is a scanning space between the shield body and the moving seat to provide the laser module to scan the external environment.

To solve above problem, the present invention additionally aims at providing a collision sensing device for laser module, so that when a shield body is collided, the shield body may drive the moving seat to move in a direction, and a traction part disposed at a periphery of the moving seat drives one end of a linkage body to move in the direction. Therefore, when the linkage body moves in the direction, it touches or presses a sensing part of a sensing element, the sensing element may thereby determine whether the shield body is collided; if it is determined that the cover shield body is collided, a collision information may be transmitted to a control unit to drive a robot to move out of trouble.

To achieve above another purpose, the present invention further provides a collision sensing device for laser module comprising:

a base disposed at any position inside or outside the robot, one surface of the base being connected to a laser module and provided with at least one limiting element and at least one blocking part;

a moving seat provided with at least one moving part and one traction part at a periphery thereof, the moving part being in contact with the limiting element to limit the moving direction of the moving seat;

a linkage body connected to the traction part at one end, and connected to the inside of the robot at the other end;

a sensing element disposed inside the robot, and provided with a sensing part, the sensing part being disposed adjacent to one side of the linkage body;

at least one elastic element sandwiched between the moving part and the blocking part, the elastic element being compressed by the moving part to have a resilient force when the moving part moves toward the position of the blocking part, the elastic element providing the moving part to move to an original position by the resilient force; and a shield body connected to the moving seat to accommodate the laser module in the shield body, the moving seat and the base.

Preferably, the collision sensing device for laser module further comprises a cover body disposed on one surface of the robot, and provided with a moving space to provide the movement of the moving seat in the moving space.

Preferably, the moving end is provided with a fixing portion at one end thereof, and the fixing portion is engaged with the elastic element to limit the position of the elastic element.

Preferably, when the moving seat moves, the traction part drives the linkage body to move toward the position of the sensing element, and when the sensing part is touched or pressed by one side of the linkage body, the sensing element determines that the shield body is subjected to a collision.

Preferably, there is a scanning space between the shield body and the moving seat to provide the laser module to scan the external environment.

To solve above problem, the present invention additionally again aims at providing a collision sensing device for laser module, so that when a shield body is collided, the shield body may drive the moving seat to move in a direction, and a traction part disposed at a periphery of the moving seat drives one end of a linkage body to move in the direction. Therefore, when the linkage body moves in the direction, it touches or presses a sensing part of a sensing element, the sensing element may thereby determine whether the shield body is collided; if it is determined that the cover shield body is collided, a collision information may be transmitted to a control unit to drive a robot to move out of trouble.

To achieve above still another purpose, the present invention further provides a collision sensing device for laser module comprising:

a base disposed at any position inside or outside the robot, one surface of the base being connected to a laser module;

a cover body disposed on one surface of the robot, and connected to the base, the cover body being provided with a moving space, at least one blocking part and at least one limiting element being disposed at a position between the cover body and the base;

a moving seat moving in the moving space, and provided with at least one moving part and one traction part at a periphery thereof, the moving part being in contact with the limiting element to limit the moving direction of the moving seat;

a linkage body connected to the traction part at one end, and connected to the inside of the robot at the other end;

a sensing element disposed inside the robot, and provided with a sensing part, the sensing part being disposed adjacent to one side of the linkage body;

at least one elastic element sandwiched between the moving part and the blocking part, the elastic element being compressed by the moving part to have a resilient force when the moving part moves toward the position of the blocking part, the elastic element providing the moving part to move to an original position by the resilient force; and a shield body connected to the moving seat to accommodate the laser module in the shield body, the moving seat and the base.

Preferably, the moving end is provided with a fixing portion at one end thereof, and the fixing portion is engaged with the elastic element to limit the position of the elastic element.

Preferably, when the moving seat moves, the traction part drives the linkage body to move toward the position of the sensing element, and when the sensing part is touched or pressed by one side of the linkage body, the sensing element determines that the shield body is subjected to a collision.

Preferably, there is a scanning space between the shield body and the moving seat to provide the laser module to scan the external environment.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE INVENTION

Figure 1:
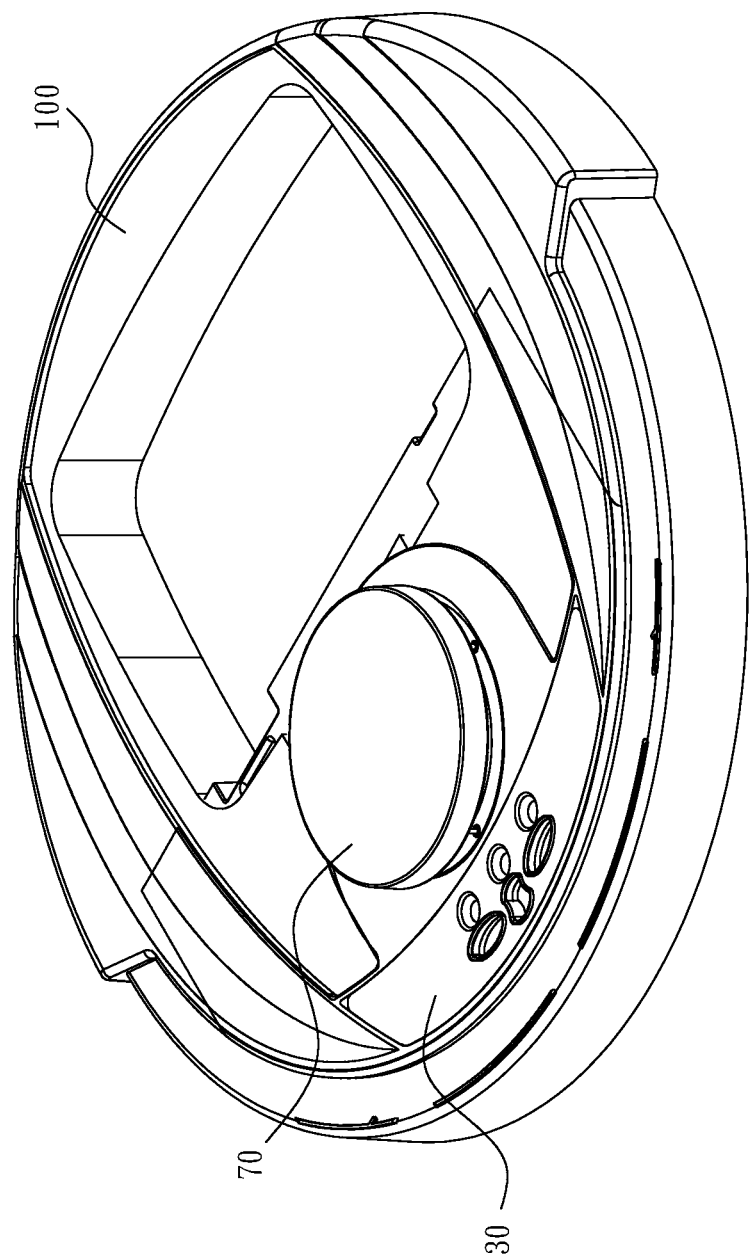
FIG. 1 is a perspective view of the combination of the present invention and a robot.
Figure 2:
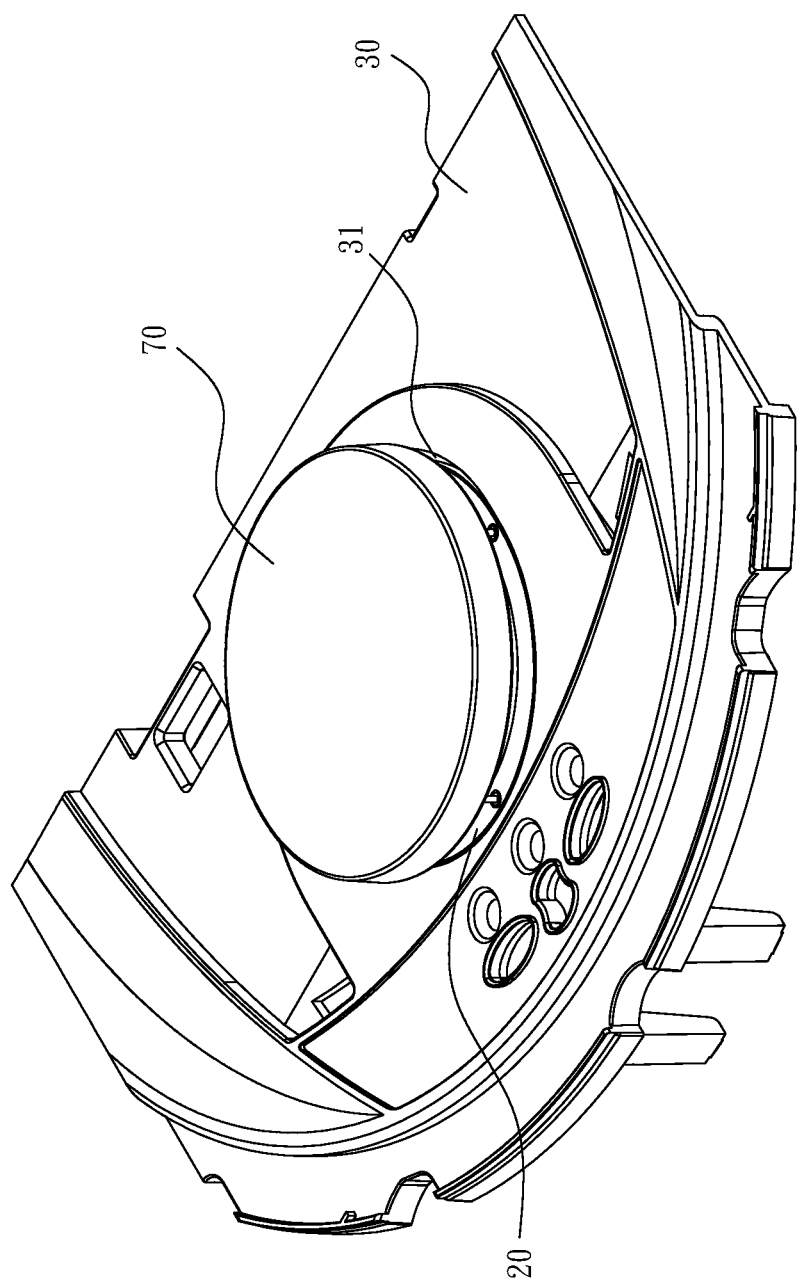
FIG. 2 is a perspective view according to the present invention.
Figure 3:
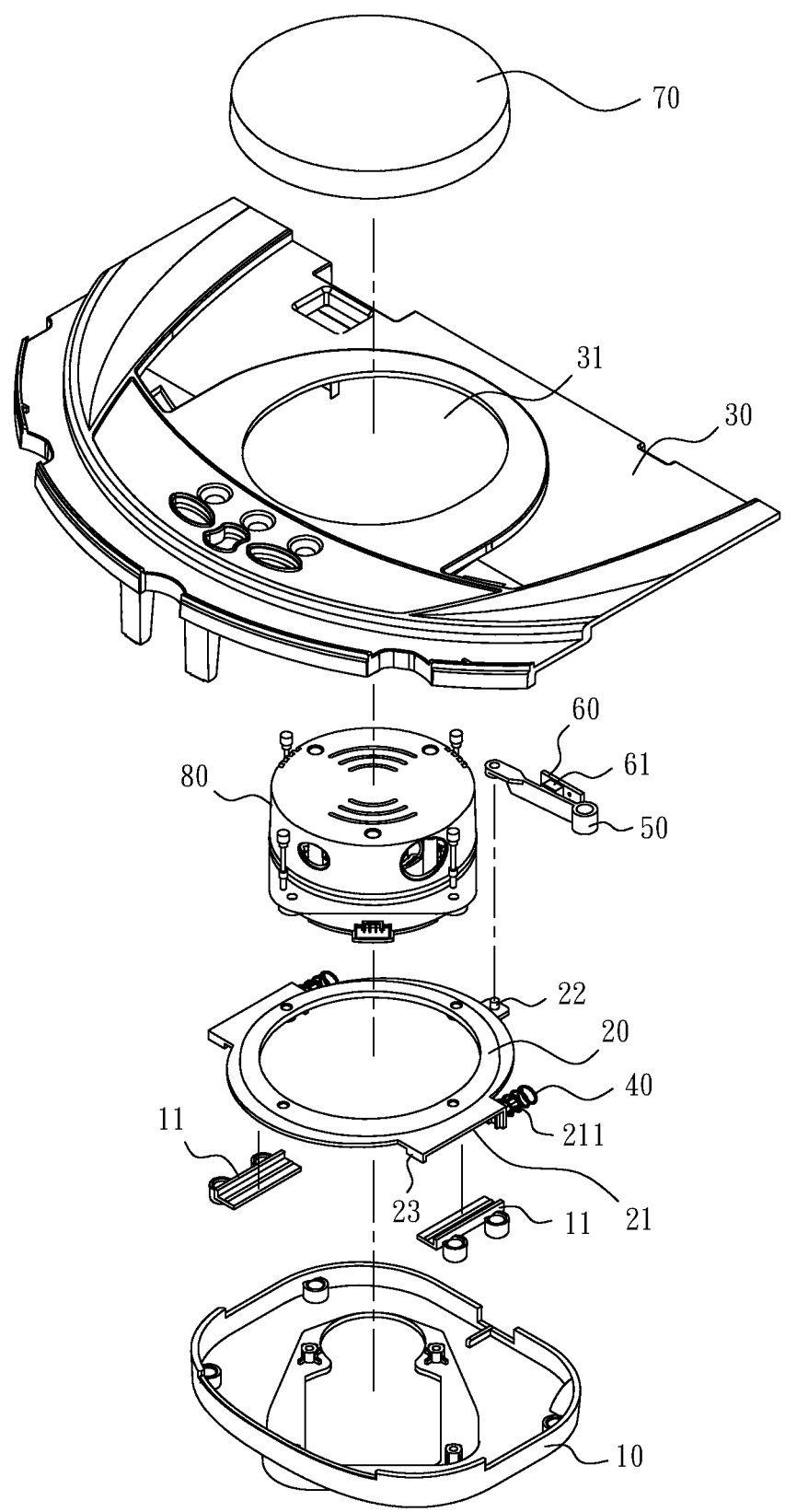
FIG. 3 is an exploded view according to the present invention.
Figure 4:
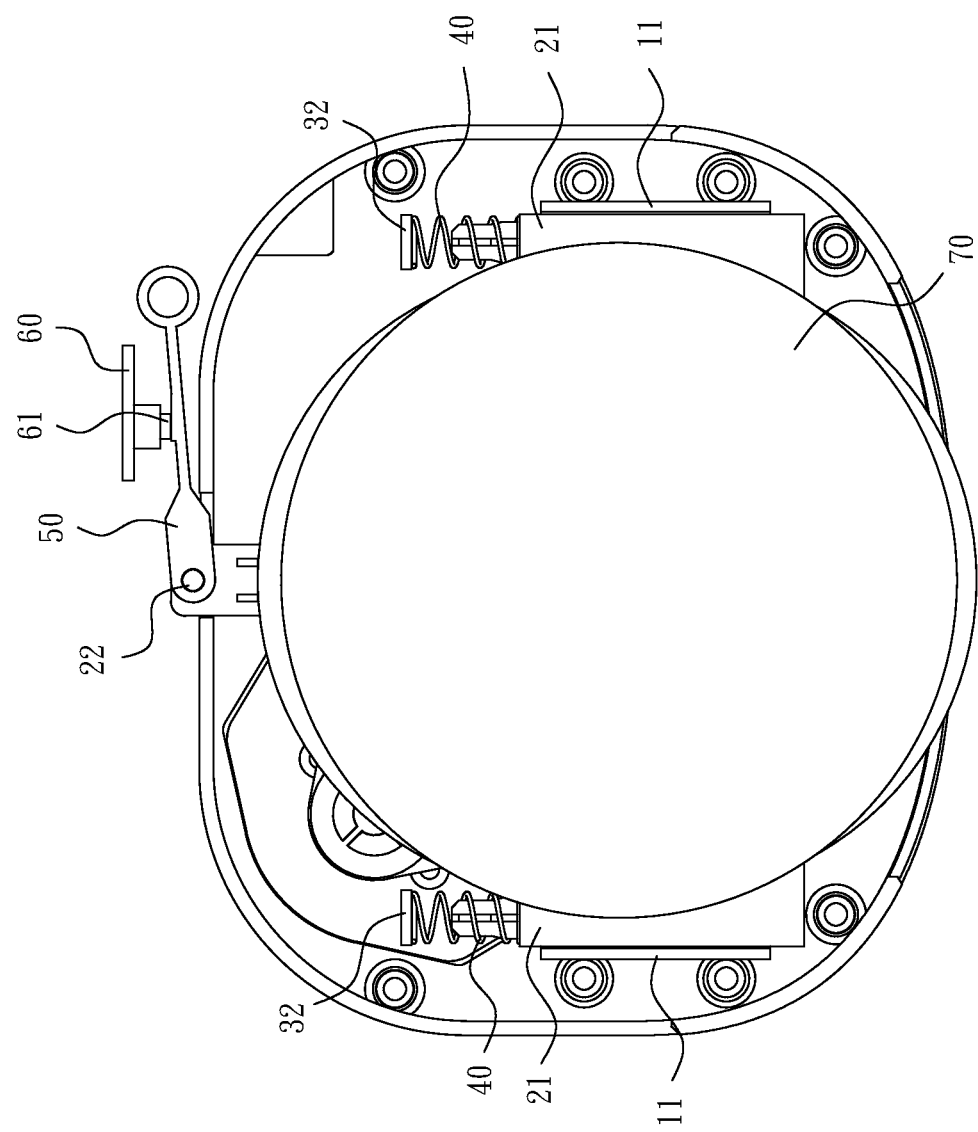
FIG. 4 is an internal view according to the present invention.
Figure 5:
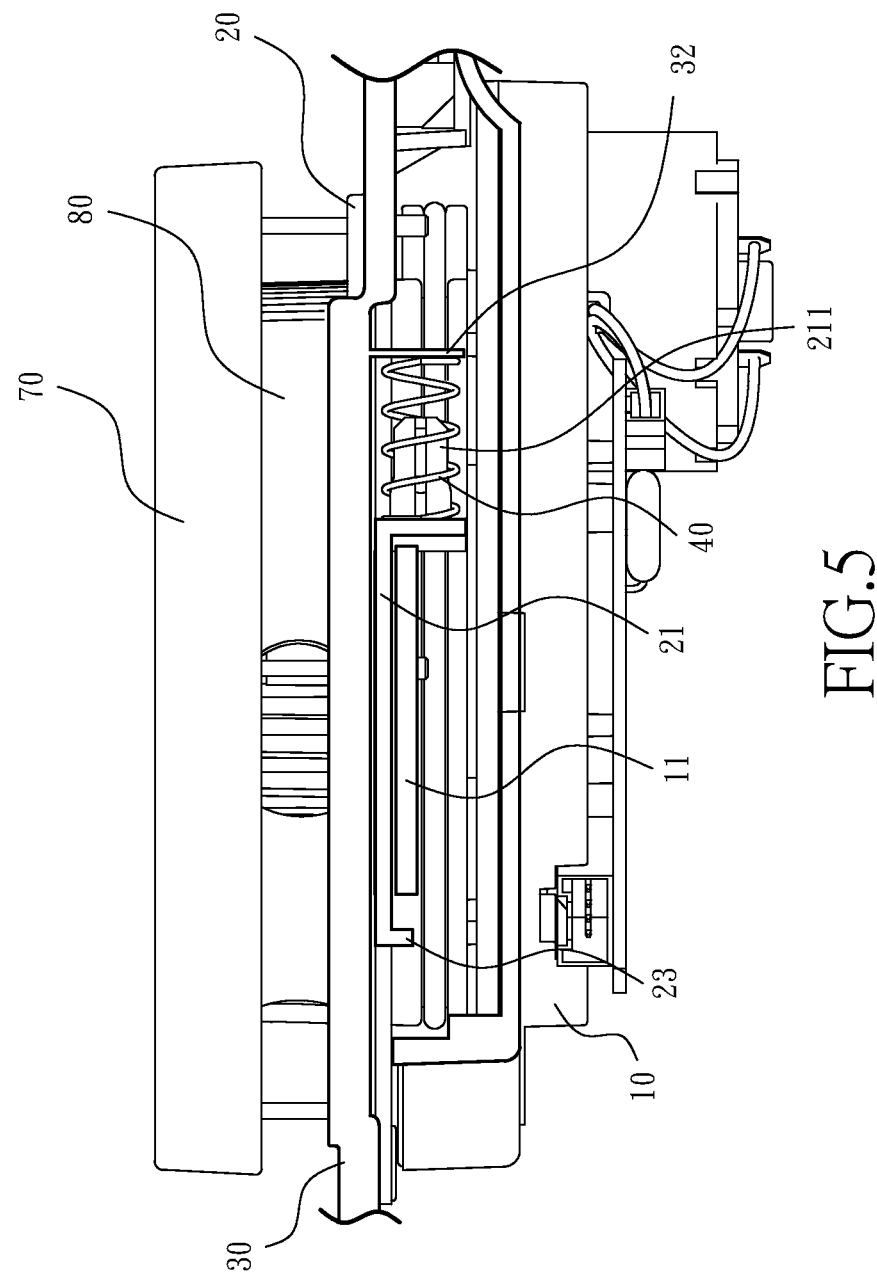
FIG. 5 is a partial cross-sectional view of the moving part and the limiting element according to the present invention.
Figure 6:
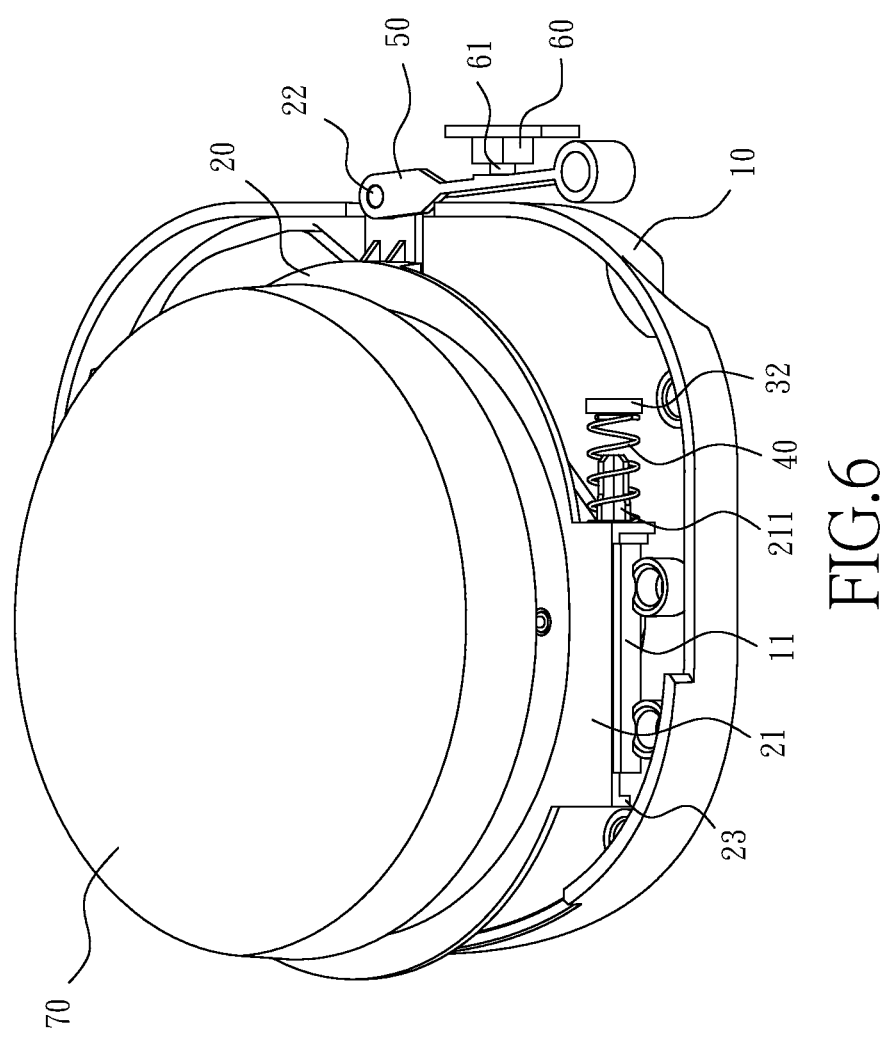
FIG. 6 is a partial view of the traction part and the linkage body according to the present invention.

In order to clarify the purpose, technical solutions, and advantages of the present invention, the present invention will be further described in detail below with reference to the drawings and embodiments. It should be understood that the specific embodiments described herein are merely illustrative of the present invention, but are not intended to limit the present invention. The following is a further description of the present invention in conjunction with the drawings:

With reference to FIGS. 1 to 6, a perspective view of the combination of the present invention and a robot, a perspective view according to the present invention, an exploded view, a partial cross-sectional view of the moving part and the limiting element and a partial view of the traction part and the linkage body are illustrated. As shown, a collision sensing device for laser module of the present invention mainly consists of a base 10, a moving seat 20, a cover body 30, at least one elastic element 40, a linkage body 50, a sensing element 60 and a shield body 70, wherein the base 10 is disposed at any position inside or outside the robot 100 (in the present embodiment, the base 10 is disposed inside the robot 100), one surface of the base 10 is connected to a laser module 80 to fix the laser module 80. The connection manner is completed by connecting a locking structure provided on a periphery of the laser module 80 to the base 10, and by the bottom surface of the laser module 80 penetrating the base 10 to be exposed to the outside. The connection manner is only an example thereof, and the connection between the base 10 and the laser module 80 is not limited to the above connection manner. Moreover, at least one limiting element 11 is disposed on one surface of the base 10.

The moving seat 20 is provided with at least one moving part 21 and a traction part 22 at a periphery thereof, and the moving part 21 is used to be in contact with the limiting element 11 to limit the moving direction of the moving seat 20 by the limiting element 11. For example, when the moving seat 20 moves, the moving seat 20 may not move backwards linearly when the moving seat 20 is subjected to a rearward force if the limiting element 11 is not in contact with the moving part 21 to limit the direction in which the moving seat 20 moves. As such, when the moving seat 20 is to be moved back to the original position, it may not effectively move back to an original position, so the purpose of the present invention may not be achieved.

In addition, the number setting of the limiting element 11 depends on the number of the moving part 21 and the position of the setting. For example, when the number of the moving part 21 is two, and is respectively disposed on the left and right sides of the moving seat 20, the limiting element 11 may be provided with two of the limiting element 11 to individually be in contact with each of the moving parts 21. However, when the number of the moving part 21 is two, and both are disposed on the left side or the right side of the moving seat 20, the limiting element 11 is only required to be provided with one of the limiting elements 11 to be in contact with the two moving seats 20 without providing two of the limiting element 11 to respectively correspond to the moving seats 20. In addition, when the number of the moving part 21 is one, regardless of which side of the moving seat 20 the moving part 21 is disposed, one of the limiting elements 11 is only required to be provided to correspond to the moving part 21.

Furthermore, the setting position of the limiting element 11 is not limited to being disposed on one surface of the base 10, because the setting of the limiting element 11 is used to limit the moving direction of the moving seat 20. Therefore, the limiting element 11 is only required to be disposed at a position that may limit the moving direction of the moving part 21.

Additionally, the moving part 21 is provided with a fixing portion 211 at one end and with a limiting part 23 at the other end, a spacing being set between the limiting part 23 and the limiting element 11; when the moving part 21 moves backward, the limiting part 23 is adjacent to the limiting element 11, and when the limiting part 23 is in contact with the limiting element 11, the moving part 21 may not move backward again due to the limitation of the limiting part 23.

The cover body 30 is disposed on one surface of the robot 100 and connected to the base 10, the cover body 30 being provided with a moving space 31; the moving space 31 is provided for the moving seat 20 to move within the moving space 31 so as to further limit the space range in which the moving seat 20 may move. Also, at least one blocking part 32 being disposed at a position between the cover body 30 and the base 10; the blocking part 32 is disposed adjacent to a periphery of the moving part 21, and the limiting element 11 may also be disposed at a position between the cover body 30 and the base 10 to be in contact with the moving part 21 for further limiting the moving direction of the moving part 21.

The elastic element 40 is sandwiched between the moving part 21 and the blocking part 32, and the fixing portion 2211 is engaged with the elastic element 40 to limit the position of the elastic element 40. When the moving part 21 moves backward, as the elastic element 40 moves backward due to the moving part 21 and the blocking part 32 bears against one end of the elastic element 40, the elastic element 40 is compressed to have a resilient force. As such, when the moving seat 20 wants to move back to the original position, the moving part 21 may move to the original position by the resilient force of the elastic element 40, further driving the moving seat 20 to move back to the original position.

Among them, the setting number of the blocking part 32 is determined by the number of the elastic element 40 to provide a function of blocking one end of the elastic element 40, thereby achieving the effect of compressing the elastic element 40. In addition, since the blocking part 32 is only required to sandwich the elastic member 40 between the moving part 21 and the blocking part 32, the setting position of the blocking part 32 is not limited to be on the cover body 30, and the blocking part 32 may be disposed on the base 10 or any positions where the elastic element 40 may be sandwiched between the moving part 21 and the blocking part 32.

One end of the linkage body 50 is connected to the traction part 22 at one end, and the linkage body 50 is disposed inside the robot 100, and the other end thereof is connected to the inside of the robot 100. Therefore, when the moving seat 20 moves backward to drive the traction part 22 to move backward, one end of the linkage body 50 is correspondingly driven backward by the traction part 22.

The sensing element 60 is disposed inside the robot 100, and the sensing element 60 is provided with a sensing part 61, the sensing part 61 being disposed adjacent to one side of the linkage body 50. Therefore, when one end of the linkage body 50 is driven backward by the traction part 22, the sensing part 61 may be touched or pressed. Then, when the sensing part 61 is touched or pressed, the sensing element 60 may determine that the shield body 70 is collided, and transmits a collision information to a control unit provided in the robot 100 to drive the robot 100 to move out of trouble. The manner of moving out of trouble, for example, drives the robot 100 to move backward, and then moves to the other direction.

The shield body 70 is connected to the moving seat 20, and the laser module 80 is accommodated in the shield body 70, the moving seat 20 and the base 10. Therefore, when the shield body 70 is collided, the moving seat 20 moves together with the shield body 70, and further causes the traction part 22 to drive the one end of the linkage body 50 to move backward, or the like.

Figure 7:
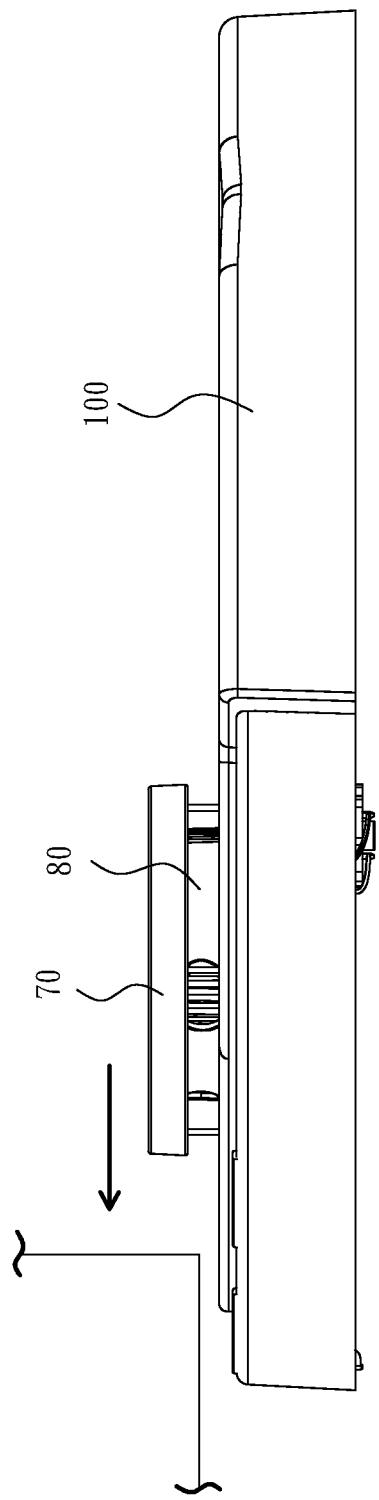
FIG. 7 is a view of the impact according to the present invention.
Figure 8:
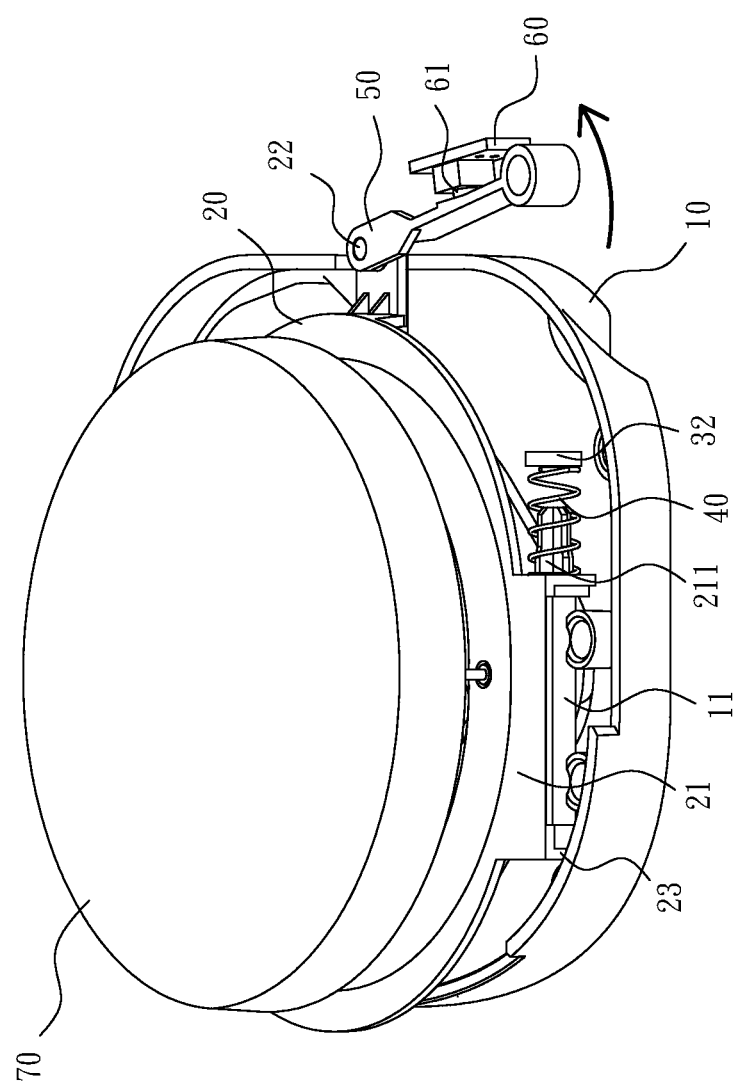
FIG. 8 is a state view of the linkage body after the impact according to the present invention.
Figure 9:
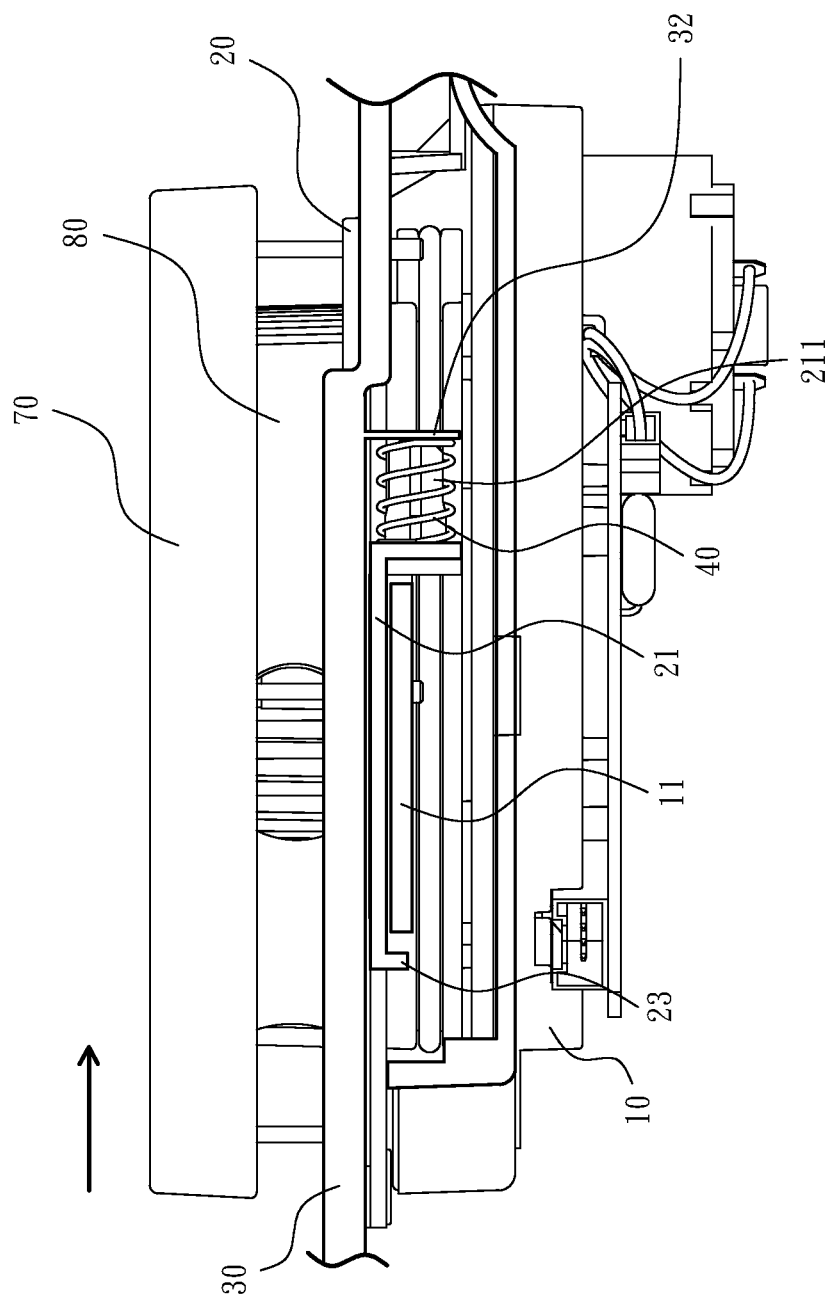
FIG. 9 is a state view of the elastic element after the impact according to the present invention.

With reference to FIGS. 7-9, an impact view, a state diagram of the linkage after the impact, and a state view of the elastic element after the impact are illustrated. As shown, when the robot 100 moves in one direction, causing the shield body 70 to collide a solid 90, the shield body 70 moves backward by a collision force (assuming that the robot 100 is moving toward a forward direction, colliding the solid 90 on the head), at which point the moving seat 20 may move backward together with the shield body 70 since the shield body 70 and the moving seat 20 are connected to each other, and the moving seat 20 is disposed in the moving space 31, and then the moving seat 20 may no longer move backward, and the shield body 70 may no longer move backward when the moving seat 20 moves to a limited position (e.g., an edge position) in the moving space 31.

However, when the moving seat 20 is driven by the shield body 70 to move backward, the moving part 21 and the traction part 22 are displaced backward together with the moving seat 20. As such, when the moving part 21 moves backward, the elastic element 40 sandwiched between the moving part 21 and the blocking part 32 may be compressed, so that the elastic element 40 has a resilient force. After the shield body 70 is separated from the solid 90, the elastic element 40 rebounds the moving part 21 to an original position (the position at which the shield body 70 has not collided with the solid 90) by the resilient force, further moving the moving seat 20 and the shield body 70 back to the original position.

And when the moving seat 20 is driven by the shield body 70 to move backward, the traction part 22 drives one end of the linkage body 50 to move backward to touch or press the sensing part 61. Then, when the sensing part 61 is touched or pressed, the sensing element 60 may determine that the shield body 70 is collided, and transmits a collision information to a control unit provided in the robot 100 to further drive the robot 100 to move out of trouble. However, when the elastic element 40 moves the moving seat 20 and the shield body 70 back to the original position, the traction part 22 moves one end of the linkage body 50 forward to separate one side of the linkage body 50 from the sensing part 61. In this way, the sensing element 60 may determine that the shield body 70 has not been collided, to continue the subsequent sensing action.

By the interaction between the above elements, the present invention may determine whether the shield body 70 is collided by the sensing element 60. If it is determined that the shield body 70 is collided, the collision information may be transmitted to the control unit to drive the robot 100 to move out of the trouble to prevent the robot 100 from being stuck and unable to move.

In the description of the present invention, it is to be understood that the orientation or positional relationship indicated by the terms "center", "horizontal", "upper", "lower", "left", "right", "top", "bottom", "inside", "outside", etc. is based on the orientation or positional relationship shown in the drawings, is merely for the purpose of describing the present invention and the simplification of the description, and does not indicate or imply that the device or element referred to must have a particular orientation, constructed and operated in a particular orientation, thereby being not understood to limit the present invention.

What is claimed is:

1. A collision sensing device comprising:
   a base, one surface of the base being connected to a laser module and provided with at least one limiting element;
   a moving seat provided with at least one moving part and one traction part at a periphery thereof, the at least one moving part being in contact with the at least one limiting element to limit a moving direction of the moving seat;
   a linkage body connected to the traction part at a first end, and having a second end;
   a sensor provided with a sensing bump, the sensing bump being disposed adjacent to one side of the linkage body;
   a cover body disposed on one side of the robot, and provided with a moving space to provide a movement of the moving seat in the moving space, at least one blocking part being disposed at a position between the cover body and the base, the at least one blocking part being disposed adjacent to a periphery of the at least one moving part;
   at least one elastic element disposed between the at least one moving part and the at least one blocking part, the at least one elastic element being compressed by the at least one moving part to have a resilient force when the at least one moving part moves toward the position of the at least one blocking part, the at least one elastic element providing a movement of the at least one moving part to move to an original position by the resilient force; and
   a shield body connected to the moving seat to accommodate the laser module in the shield body, the moving seat and the base.

2. The collision sensing device according to claim 1, wherein the moving end is provided with a fixing portion at one end thereof, the fixing portion being engaged with the at least one elastic element to limit the position of the at least one elastic element.

3. The collision sensing device according to claim 1, wherein the at least one moving part is provided with a limiting part at the second end, a spacing being set between the limiting part and the limiting element; when the at least one moving part moves toward the position of the at least one blocking part, the limiting part is adjacent to the limiting element, and when the limiting part is in contact with the limiting element, the at least one moving part does not move toward the position of the at least one blocking part due to limitation of the limiting part.

4. The collision sensing device according to claim 1, wherein when the shield body is collided, the shield body drives the moving seat to move in a direction, and the moving seat drives one end of a linkage body to move in the direction, then the traction part drives the linkage body to move toward the position of the sensor, and the sensing bump is touched or pressed by one side of the linkage body, the sensor determines that the shield body is subjected to a collision.

5. The collision sensing device according to claim 1, wherein there is a scanning space between the shield body and the moving seat to permit the laser module to scan an external environment.

6. A collision sensing device comprising:
   a base, one surface of the base being connected to a laser module and provided with at least one limiting element and at least one blocking part, the at least one blocking part being disposed adjacent to a periphery of the at least one moving part;
   a moving seat provided with at least one moving part and one traction part at a periphery thereof, the at least one moving part being in contact with the at least one limiting element to limit a moving direction of the moving seat;
   a linkage body connected to the traction part at a first end, and having a second end;
   a sensor provided with a sensing bump, the sensing bump being disposed adjacent to one side of the linkage body;
   at least one elastic element disposed between the at least one moving part and the at least one blocking part, the at least one elastic element being compressed by the at least one moving part to have a resilient force when the at least one moving part moves toward the position of the at least one blocking part, the at least one elastic element providing a movement of the at least one moving part to move to an original position by the resilient force; and
   a shield body connected to the moving seat to accommodate the laser module in the shield body, the moving seat and the base.

7. The collision sensing device according to claim 6, further comprising a cover body disposed on one surface of the robot, and provided with a moving space to provide a movement of the moving seat of the moving seat in the moving space.

8. The collision sensing device according to claim 6, wherein the moving end has a fixing portion at one end thereof, and the fixing portion is engaged with the at least one elastic element to limit a position of the at least one elastic element.

9. The collision sensing device according to claim 6, wherein when the shield body is collided, the shield body drives the moving seat to move in a direction, and the moving seat drives one end of a linkage body to move in the direction, then the traction part drives the linkage body to move toward the position of the sensor, and the sensing bump is touched or pressed by one side of the linkage body, the sensor determines that the shield body is subjected to a collision.

10. The collision sensing device according to claim 6, wherein there is a scanning space between the shield body and the moving seat to permit the laser module to scan an external environment.

11. A collision sensing device comprising:
a base, one surface of the base being connected to a laser module;
a cover body disposed on one surface of the robot, and connected to the base, the cover body being provided with a moving space, at least one blocking part and at least one limiting element being disposed at a position between the cover body and the base;
a moving seat moving in the moving space, and provided with at least one moving part and one traction part at a periphery thereof, the at least one moving part being in contact with the at least one limiting element to limit a moving direction of the moving seat;
a linkage body connected to the traction part at a first end, and having a second end;
a sensor provided with a sensing bump, the sensing bump being disposed adjacent to one side of the linkage body;
at least one elastic element disposed between the at least one moving part and the at least one blocking part, the at least one elastic element being compressed by the at least one moving part to have a resilient force when the at least one moving part moves toward a position of the at least one blocking part, the at least one elastic element providing a movement of the at least one moving part to move to an original position by the resilient force; and
a shield body connected to the moving seat to accommodate the laser module in the shield body, the moving seat and the base.

12. The collision sensing device according to claim 11, wherein the moving end is provided with a fixing portion at one end thereof, the fixing portion being engaged with the at least one elastic element to limit a position of the at least one elastic element.

13. The collision sensing device according to claim 11, wherein when the shield body is collided, the shield body drives the moving seat to move in a direction, and the moving seat drives one end of a linkage body to move in the direction, then the traction part drives the linkage body to move toward the position of the sensor, and the sensing bump is touched or pressed by one side of the linkage body, the sensor determines that the shield body is subjected to a collision.

14. The collision sensing device according to claim 11, wherein there is a scanning space between the shield body and the moving seat to permit the laser module to scan an external environment.

\* \* \* \* \*